United States Patent [19]

Denber

[11] Patent Number: 5,365,251
[45] Date of Patent: Nov. 15, 1994

[54] IMAGE QUALITY IMPROVEMENT BY HIERARCHICAL PATTERN MATCHING WITH VARIABLE SIZE TEMPLATES

[75] Inventor: Michel J. Denber, Rochester, N.Y.
[73] Assignee: Xerox Corporation, Stamford, Conn.
[21] Appl. No.: 936,456
[22] Filed: Aug. 28, 1992
[51] Int. Cl.[5] .............................................. G09G 1/16
[52] U.S. Cl. ..................................... 345/136; 345/203
[58] Field of Search ................. 340/154, 726, 728; 382/54; 358/456–458; 345/130, 137, 138, 203

[56] References Cited

U.S. PATENT DOCUMENTS

| | | | |
|---|---|---|---|
| 4,437,122 | 3/1984 | Walsh et al. | 358/166 |
| 4,486,785 | 12/1984 | Lasher et al. | 358/284 |
| 4,517,604 | 5/1985 | Lasher et al. | 358/262 |
| 4,646,355 | 2/1987 | Petrick et al. | 382/54 |
| 4,681,424 | 7/1987 | Kantor et al. | 355/14 R |
| 4,736,254 | 4/1988 | Kotera et al. | 358/457 |
| 4,760,460 | 7/1988 | Shimotohno | 358/457 |
| 4,780,711 | 10/1988 | Doumas | 340/728 |
| 4,847,641 | 7/1989 | Tung | 346/154 |
| 4,849,746 | 7/1989 | Dubner | 340/726 |
| 4,873,515 | 10/1989 | Dickson et al. | 340/728 |
| 4,908,780 | 3/1990 | Priem et al. | 340/728 |
| 5,107,349 | 4/1992 | Ng et al. | 358/457 |
| 5,130,821 | 7/1992 | Ng | 358/457 |
| 5,201,013 | 4/1993 | Kumagai | 358/457 |

OTHER PUBLICATIONS

Thompson, IBM Tech. Disclosure, pp. 254–256, 1977, vol. 20, No. 1, Jun. 1977.

*Primary Examiner*—Alvin E. Oberley
*Assistant Examiner*—Steven J. Saras
*Attorney, Agent, or Firm*—Oliff & Berridge

[57] ABSTRACT

Image quality is improved by the prevention of aliasing using a hierarchial pattern matching operation incorporating variable-sized templates. A template which is passed over an image is partitioned into a plurality of sub-templates. The corner sub-templates of the template are eliminated from consideration. It is determined whether the remaining sub-templates contain anything other than all-white or all-black. If a sub-template reports something other than all-white or all-black, the sub-template is checked with a matching region. The matching region defines the action to be taken on the central pixel beneath the template. The pattern matching operation prevents the necessity for an increased memory capacity while providing increased levels of gray for each pixel.

11 Claims, 3 Drawing Sheets

IMAGE QUALITY IMPROVEMENT BY HIERARCHICAL PATTERN MATCHING WITH VARIABLE SIZE TEMPLATES

BACKGROUND OF THE INVENTION

1. Field of the Invention

The present invention relates to the improvement in image quality by the prevention of aliasing, and more particularly, the improvement of image quality by hierarchial pattern matching with variable-sized templates.

2. Description of the Related Art

In the output of printing systems, diagonal lines and edges may appear coarse or jagged, exhibiting a stair-step appearance ("jaggies") as illustrated in FIG. 1. This appearance is the result of spurious high-frequency components (aliasing) from an image, the high-frequency components typically originating in bitmap representations and raster output devices such as CRT displays and laser printers due to unavoidable transitions introduced into a continuous image during quantization.

Two common methods of reducing the effect of jaggies are to: 1) increase the spatial resolution; and 2) perform anti-aliasing. If the steps between adjacent picture elements (pixels) are sufficiently small, the eye will integrate the steps into a smooth curve. The increased spatial resolution, however, requires additional memory capability and more complex and expensive output devices.

Anti-aliasing thus provides an alternative to increased spatial resolution. In traditional signal processing, anti-aliasing is accomplished in the frequency domain through the application of a low-pass filter. Spatial domain image processing, however, is advantageous over frequency domain processing since spatial domain processing tends to be less computationally intensive and more intuitive.

A standard approach to spatial anti-aliasing is to use a computer to simulate a flying spot scanner. A spot of fixed size scans the image in raster fashion. The source image (typically a bitmap) is effectively sampled at a lower rate, with each pixel in the output being the average value of the area illuminated by the spot at a given time. The spot is simulated by a rectangular region or filter containing a set of possibly weighted values. FIG. 2 illustrates such a filter.

The filter such as the filter of FIG. 2 is then overlaid on the image and applied to the entire image in chunks the size of the filter. At each stop, the value of the output pixel is the average of the image pixels lying beneath the filter.

If the weights in the filter are non-uniform, each pixel is multiplied by the corresponding weight prior to the averaging of the image pixels.

Changing the weights will simulate different spot sizes. The larger the filter and the more uniform the weights, the broader the anti-aliasing action will be. The visual effect is that the image will appear slightly blurred. Taken to the extreme, one could imagine a filter the size of the entire image. The output would be a single pixel whose value is the overall average intensity of the original image.

The spatial filter has the advantage of being easy to implement and easy to characterize, since all of the signal-processing literature on low-pass filtering is applicable thereto. However, the spatial filtering has a significant disadvantage when applied to the domain of font processing. In this application, the very uniformity and lack of discrimination of the filter becomes a significant problem. Letter forms consist of vertical, horizontal and angled strokes and, in most fonts, smooth curves. Since raster devices (CRT's and printers) can display both vertical and horizontal strokes without any aliasing, it is undesirable to apply anti-aliasing to such strokes, since the application of anti-aliasing degrades the sharpness of the edges and can change the apparent edge location of a stroke. Unfortunately, the spatial filter has no way of knowing what sort of edge it is filtering. The standard solution to this problem is to filter the character in a different phase, with the starting location of the filter slightly offset, so that the edge of the stroke to be left alone falls just between successive applications of the filter. While this method is an improvement over plain filtering, it cannot guarantee that all vertical and horizontal strokes will be skipped. For example, if a phase is selected to skip the first vertical stroke in the character "H", it may hit the second vertical stroke, if the distance between the two strokes is not an even multiple of the width of the filter. In addition, the amount of processing required for each character is increased.

An alternative to spatial filtering by integration is geometric filtering. In geometric filtering, the image is scanned with a rectangular region. The content of the region at any given time is treated as the left-hand side of a potentially arbitrary replacement rule. Thus, for any given pattern being considered, a user may specify exactly what pixel, or combination of pixels, should be placed in an output image to achieve a desired effect.

Geometric filtering can be applied to anti-aliasing for bitmap characters. For example, one level of gray can be added to binary (black and white) characters. Thus, the input is a binary bitmap, and the output is a bitmap stored using two bits per pixel, where each pixel can be either black, white or gray. Gray pixels are added to "fill in" steps along diagonal edges. FIG. 3 illustrates a 2×2 square template which can be passed over the image of the character.

At any given location, the template can contain one of 16 ($2^4$) different pixel arrangements. A determination is made of what the output image should look like at the point of each of the 16 pixel arrangements. If all four pixels are white, it is determined that no further processing is needed since the character has not been reached. Therefore, the output is also four white pixels. Likewise, the case of four black pixels is identical by symmetry. If two pixels in the right hand column are black and the two pixels in the left hand column are white, it is determined that the left-hand edge of a vertical stroke is entered. Thus, no anti-aliasing need be applied. These pixels are illustrated in FIG. 4. Likewise, the case of two black pixels in a horizontal row is identical by symmetry.

The only unique template needed identifies areas that should have gray added, i.e., three black pixels and one white pixel. As illustrated in FIGS. 5a–5d, there are four similar templates by square symmetry. If this case is encountered, the black pixels are copied to the output, and the white pixel is replaced by a gray pixel. Thus, it is ensured that gray pixels are only added along diagonal edges.

In pattern matching, the size of the template used determines the complexity of processing operations which could be performed. For example, the 2×2 template can be used to add gray pixels to 45° stair steps and bitmap images. Likewise, 3×3 templates can also be used to add gray pixels, but can selectively place two different levels of gray, while identifying regions of half bits in characters and replacing these regions with gray. The problem with pattern-matching is that if the size of the template is increased, the amount of memory needed to store the associated look-up table for specifying the replacement patterns increases exponentially. For example, a 2×2 table contains 16 entries, while a 3×3 table contains 512 entries. The future trend for printers appears to be in a direction of providing more levels of gray, up to 16 bits per pixel. To allocate these bits meaningfully in the context of pattern matching would require a 16×16 template.

Other methods have been disclosed for improving image quality in printing systems by reducing aliasing.

In U.S. Pat. No. 4,780,711 to Doumas, an assumed boundary lines method is described. In this method, an array of pixels in an image is selected and compared to a plurality of predetermined pixel array patterns. When a match is found, an assumed contour line is determined running through the array. The intensity of the center pixel of the array is chosen based on the angle of the assumed line through the array.

In the U.S. Pat. No. 4,517,604 to Lasher et al., print element (pel or pixel) data is scanned into two arrays. The first array is scanned row by row to identify any black or white pel runs. White or black pels in the second array are overwritten with gray pels as a function of the pel runs identified in the first array. The method is then repeated column by column. The resulting second array will have reduced line width variations when compared to the first array.

U.S. Pat. No. 4,437,122 to Walsh et al. utilizes shift registers with decoders to generate an appropriate signal. Successive lines of pixel data are stored in successive parallel shift registers that are coupled to decoders. In these decoders, pixels surrounding a specific pixel are compared to each other in order to generate print head driving signals depending on whether curved or straight lines are being formed.

Another approach in controlling quality is shown in U.S. Pat. No. 4,486,785 to Lasher et al., where gray scale pels are introduced in close proximity to unit steps in a bitmap image. Whenever a unit step is found, the distance between the step and the nearest transition is computed. This distance is used in a look- up table for the appropriate gray scale values.

In U.S. Pat. No. 4,646,355 to Petrick et al., a method is shown for the removal of unwanted dots and voids. In this method, the user defines the smallest data item of a bitmap. Images smaller than this data item are removed in accordance with comparisons performed in a pixel window. In an n×n window of pixels, pixels along the perimeter are examined. If bordering pixels are of the same intensity, the internal pixels are changed to match these bordering pixels.

In U.S. Pat. No. 4,681,424 to Kantor et al., a method is disclosed for increasing the width of single pixel lines by advancing the leading edge of pulses defining a white-to-black transition and delaying the trailing edge of pulses defining a black-to-white transition. For lines parallel to the scan direction, gray pulses are added to widen lines. In U.S. Pat. No. 4,847,641 to Tung, a method is disclosed for image enhancement through template matching. Piecewise bitmap patterns are matched to replace the central bit in the pattern with a unique compensation bit.

The use of pattern matching is an important technique for image processing, but, as discussed above, requires a large memory capacity to store the associated look-up table for specifying replacement patterns. Thus, the implementation of a pattern matching technique using templates much larger than would be possible under the standard table look-up is desired.

SUMMARY OF THE INVENTION

The present invention relates to the improvement of image quality by the prevention of aliasing. A pattern matching template for passage over the image of a character is partitioned into a set of smaller sub-templates. The sub-templates located in the corner units are discarded. The remaining sub-templates are checked to determine whether the output image in each remaining sub-template is defined as anything other than all-white or all-black. If the output image in each sub-template is defined as anything other than all-white or all-black, the sub- template is checked with a matching region. The matching region defines an action to be taken on the central pixel. Pattern-matching is then performed within the area.

If one sub-template causes the central pixel to be modified in one way, and another sub-template causes the central pixel to be modified in a different way, the conflicting modifications are averaged in the case of gray-scale pattern matching. For binary bitmaps, a vote is taken among the sub-templates requesting modifications. In the case of a tie, a regular pattern matching operation is performed on the central sub-template, and the result achieved by the regular pattern matching operation is used. If none of the sub-templates report modifications to the central pixel, a regular pattern matching operation is performed on the central sub-template. The entire template is translated across the image, with a hierarchial pattern matching of the present invention being applied.

BRIEF DESCRIPTION OF THE DRAWINGS

The invention will be described with reference to the following figures, wherein.

DETAILED DESCRIPTION OF PREFERRED EMBODIMENT

Figure 1:
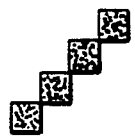
FIG. 1 illustrates a digitized diagonal line exhibiting a stairstep appearance.
Figure 2:
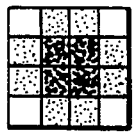
FIG. 2 illustrates a commonly used spatial filter for performing anti-aliasing.
Figure 3:
FIG. 3 illustrates a square template used in pattern matching.
Figure 4:
FIG. 4 illustrates entry of the square template to a vertical edge.
Figure 5A:
FIGS. 5a–5d illustrate anti-aliasing square templates.
Figure 5B:
Figure 5C:
Figure 5D:
Figure 6:
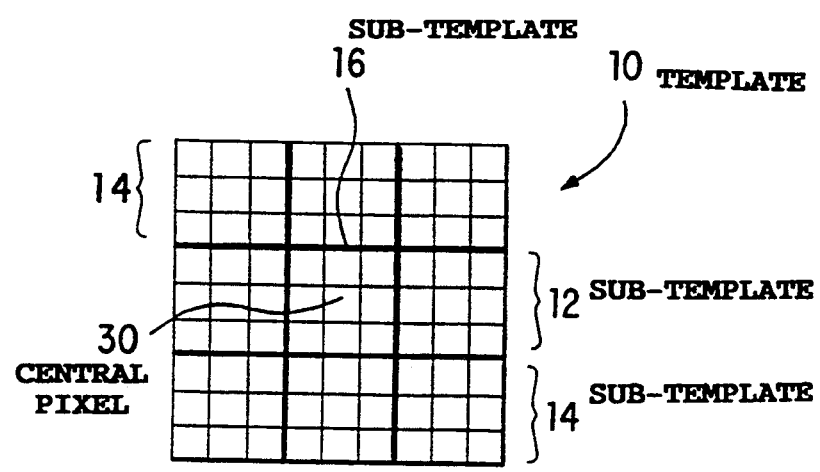
FIG. 6 illustrates a 9×9 template partitioned into a set of smaller sub-templates.
Figure 7:
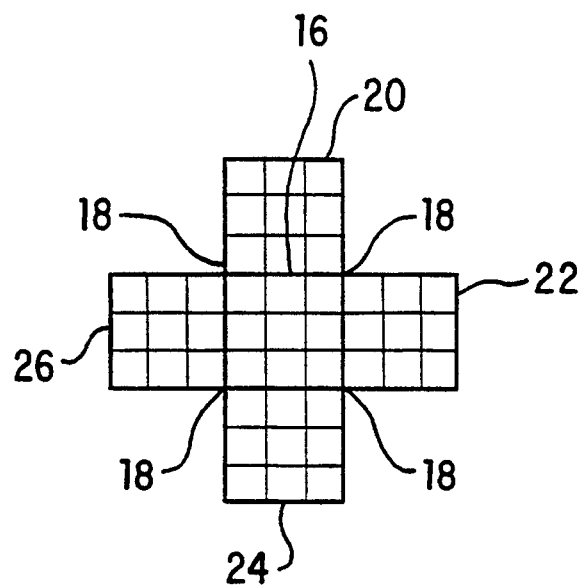
FIG. 7 illustrates the sub-templates of FIG. 6 with the corner sub-templates removed.
Figure 8:
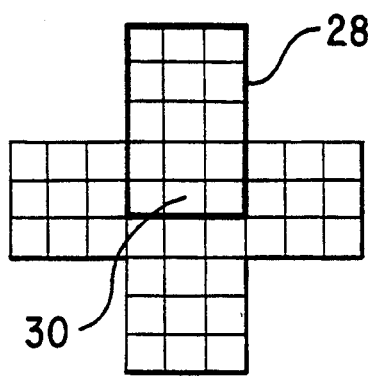
FIG. 8 illustrates the checking of a sub-template with a 3×5 matching region.

Referring now to FIGS. 6–8, a hierarchial pattern matching of the present invention is described.

In FIG. 6, a pattern matching template commonly used in pattern matching, e.g., a 9×9 template 10, is partitioned into nine 3×3 sub-templates 12 to provide a set of smaller sub-templates. When the template 10 is partitioned into smaller sub-templates, a central sub-template 16 should be defined with a central pixel 30 defined at the center of central sub-template 16. Bordering central sub-template 16 are corner sub-templates 14 and edge sub-templates 20, 22, 24 and 26 (FIG. 7). The nine 3×3 sub-templates 12 are passed over an image on a pixel-by-pixel basis such that central pixel 30 is defined at the center of the nine 3×3 sub-templates 12.

Because there is no possible image in which only one or more of corner sub-templates 14 and central sub-template 16 are occupied while none of the other sub-templates are occupied and wherein the decision to be made about the central pixel 30 would depend on the contents of the corner sub-templates 14, the four corner sub-templates 14 can then be removed from consideration. The template illustrated in FIG. 7 results.

The corner sub-template 14 can be removed because the corner sub-templates 14 only contact the central sub-template 16 at a single point 18. If no other sub-templates are occupied, i.e., sub-templates 20, 22, 24 and 26 are not occupied, the corner sub-templates can contain any combination of pixels without affecting the status of the central sub-template 16. Thus, the single point connection 18 can be considered a bottle neck in the flow of information between the sub-templates and the central pixel.

The sub-templates remaining after removal of the corner sub-templates 14 are then checked to determine whether they contain any information other than all-white or all-black. If a sub-template reports something other than all-white or all-black, the sub-template is checked with a matching region such as a 3×5 matching region 28 illustrated in FIG. 8. The matching region 28 defines a context which will be used to determine the action to be taken on the central pixel 30. The size of the matching region is a function of the template size. The matching region is the size of the sub-template plus just enough of the central sub-template 16 to include the central pixel 30. Thus, for the 9×9 template, the size of the matching region is 3×5. The matching region 28 extends from sub-template 20, 22, 24 or 26 to a portion of central sub-template 16 including central pixel 30.

For any given pattern under the matching region being considered, it may be specified exactly which pixel, or combination of pixels should be placed in the output image to achieve a form of image processing such as the anti-aliased effect. The image can be interpreted as an index number and a corresponding pattern can be retrieved from a look-up table and copied into the image. The template is moved over the entire image, and the appropriate action is taken at each step. Each pattern can be represented, for example, as a 4-bit number used as an index into an array whose contents specify the action to be taken regarding the central pixel 30 currently under consideration.

If one sub-template causes the central pixel 30 to be modified in one way, and another sub-template causes the central pixel 30 to be modified in a different way, the conflicting modifications are averaged in the case of gray-scale pattern-matching. For binary bitmaps, a vote is taken among the sub-templates requesting modifications. In the case of a tie, a regular pattern matching operation using, for example, a 3×3 template, is performed on the central sub-template 16. The result of the 3×3 pattern matching operation is then used. If none of the sub-templates report anything interesting, then a pattern matching operation such as a 3×3 pattern matching operation is performed on the central sub-template 16. The entire template is translated across the image just as in regular pattern-matching, with the above-described hierarchial process being applied to generate each match.

A digital computer is used to generate output images using the above-described hierarchical pattern matching operation. The digital computer should preferably have the bit-block transfer instruction (bitblt) available in its hardware to speed up the operation. The chip CL-GP3150 RPX, made by Cirrus Logic, a raster printer accelerator, can be used to perform this operation.

While the invention has been described using a 9×9 template, different sized templates can alternatively be used. Thus, the 9×9 template is merely used as an illustrative example.

While this invention has been described in conjunction with a specific embodiment thereof, it is evident that many alternatives, modifications and variations will be apparent to those skilled in the art. Accordingly, the preferred embodiment of the invention as set forth herein is intended to be illustrative, not limiting. Various changes may be made without departing from the spirit and scope of the invention as defined in the following claims.

What is claimed is:

1. A pattern matching method in a signal processing device for improving image quality, comprising:
   partitioning a template into a plurality of sub-templates;
   passing the template over an image on a pixel-by-pixel basis such that the template is centered about a central pixel;
   determining whether the sub-templates contain image information other than either of all white and all black;
   if any of the sub-templates are determined to contain image information other than either of all white and all black, checking the sub-template containing such image information by using a matching region, said matching region including at least a portion of the sub-template containing such image information but less than the entire template, said matching region extending beyond the sub-template containing such image information at least to the central pixel;
   matching a pattern in the matching region to a corresponding pattern to specify an action to be taken on the central pixel; and
   generating an output image based on the step of matching the pattern in the matching region to a corresponding pattern.

2. The method according to claim 1, including removing corner sub-templates of said template prior to passing the template over the image.

3. The method according to claim 2, wherein if more than one of said sub-templates are determined to contain image information other than either of all white and all black, resulting in the use of more than one matching region and resulting in the specification of different actions to be taken on the central pixel, said method includes averaging the Specified actions to be taken on the central pixel.

4. The method according to claim 2, wherein if more than one of said sub-templates are determined to contain image information other than either of all white and all black, resulting in the use of more than one matching region and resulting in the specification of different actions to be taken on the central pixel, said method includes taking a vote among the specified actions to be taken on the central pixel.

5. The method according to claim 4, wherein if said vote results in a tie, said method includes matching a pattern in a central one of said sub-templates to a corresponding pattern to specify an action to be taken on the central pixel.

6. The method according to claim 5, wherein said step of matching a pattern in a central one of said sub-templates comprises a $3 \times 3$ pattern matching operation.

7. The method according to claim 2, wherein if none of the sub-templates is determined to contain image information other than either of all white and all black, said method includes performing a pattern matching operation on a central one of said sub-templates.

8. The method according to claim 7, wherein said pattern matching operation comprises a $3 \times 3$ pattern matching operation.

9. The method according to claim 1, wherein said template comprises a $9 \times 9$ template.

10. The method according to claim 1, wherein said sub-templates comprise nine $3 \times 3$ sub-templates.

11. The method according to claim 1, wherein:
the partitioning step includes partitioning the template into a central sub-template and at least one edge sub-template that borders the central sub-template;
the determining step includes determining whether the least one edge sub-template contains image information other than either of all white and all black;
the checking step occurs if any edge sub-template is determined to contain image information other than either of all white and all black; and
the matching region used in the checking step includes at least a portion of the edge sub-template containing such information and extends beyond the edge sub-template containing such image information into the central sub-template at least to the central pixel.

* * * * *